United States Patent
Shiratori (12) United States Patent (10) Patent No.: US 6,554,974 B2
(45) Date of Patent: Apr. 29, 2003

(54) METHOD OF MANUFACTURING INFORMATION RECORDING MEDIUM

(75) Inventor: Tsutomu Shiratori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/730,384

(22) Filed: Dec. 6, 2000

(65) Prior Publication Data

US 2001/0017256 A1 Aug. 30, 2001

(30) Foreign Application Priority Data

Dec. 7, 1999 (JP) .......................... 11-347547

(51) Int. Cl.⁷ .......................... C23C 14/34; C23C 16/00
(52) U.S. Cl. .......................... 204/192.32; 204/192.34; 204/192.35; 204/192.2; 427/130; 427/131
(58) Field of Search .......................... 204/192.2, 192.32, 204/192.35, 192.34; 427/128, 129, 130, 131

(56) References Cited

U.S. PATENT DOCUMENTS

| 5,368,986 A | * 11/1994 | Terao et al. ................. 430/270 |
| 5,883,879 A | * 3/1999 | Fukuoka et al. .......... 369/275.4 |
| 6,177,175 B1 | * 1/2001 | Hashimoto ................... 428/141 |
| 6,180,208 B1 | * 1/2001 | Shiratori et al. ............ 428/141 |

FOREIGN PATENT DOCUMENTS

JP          10-275369          * 10/1998

* cited by examiner

Primary Examiner—Rodney G. McDonald (57) ABSTRACT

A recording film is formed on a surface of a substrate, including the slopes, which are positioned on both sides of each information track and have surfaces not parallel to the surfaces of the information tracks. The surface of the substrate is sputter-etched by accelerated ions impinging against the substrate surface in a substantially vertical direction. The recording film on each slope is etched away based on the dependence of a sputtering rate upon an incident angle of the ions, while the recording film remains on the surface of each information track.

6 Claims, 4 Drawing Sheets

METHOD OF MANUFACTURING INFORMATION RECORDING MEDIUM

BACKGROUND OF THE INVENTION

1. Field of the Invention

The present invention relates to a method of manufacturing an information recording medium in which a recording film is formed on a substrate. More particularly, the present invention relates to a method suitable for manufacturing a magneto-optical recording medium of the domain wall shift type.

2. Description of the Related Art

Various types of optical and magnetic recording mediums are known wherein a recording film is formed on a substrate. An optical recording medium for recording information corresponding to changes in the optical state, which can be detected using light, can record information with a high density and has been practiced in the form of an optical disk, card or the like.

Changes in the optical state of an optical recording medium are provided by pits formed in the medium surface, the presence/absence or deformation of a reflecting film, changes in the refractive index, inversion of magnetization, etc. Of these examples, inversion of magnetization is detected as a change in the state of polarization of, e.g., reflected light, whereas a change in the amount of, e.g., reflected light is detected in the other examples.

Information is recorded on or is reproduced from an optical recording medium forming marks that cause changes in the optical state as a mark train corresponding to the information, and the mark train is time-serially detected as changes in the amount of, e.g., reflected light for reproduction of the recorded information.

In a recording mode, where such changes in the optical state are caused by heating upon irradiation of a laser beam, the size and shape of state-changed areas (recording marks) depend upon a temperature distribution induced on a recording film by local heating. The temperature distribution is affected by diffusion of heat in a direction along the film surface. Therefore, even when a heated area is moved at a constant linear speed, by keeping constant the amount of heat applied per unit time, the temperature distribution formed by the applied heat changes depending upon differences in the distance that the heated area traversed and the distance from the area that has just been heated. For that reason, if the heating is performed simply corresponding to information, the width of the marks formed in accordance with an information pattern varies. Then, if a mark train formed in such a manner is time-serially read by a light beam scan, there is a risk that the original information might be incorrectly reproduced because of an increased timing jitter in detection of the marks. To avoid such a problem, a variety of recording compensation methods have been proposed that record information after adjusting the amount of heat applied per unit time, the heating time, etc. in accordance with an information pattern. Those methods, however, lead to a problem in that a recording device becomes complicated.

Also, narrowing the intervals between information tracks to achieve a higher density results in a problem of cross-erase or cross-write. Specifically, when information is recorded on or erased from one track by heating and laser beam irradiation, information bits stored on the adjacent tracks might be affected due to heat diffusion, if the intervals between the tracks are too small.

Further, in Japanese Patent Laid-Open No. 6-290496, the inventor proposed a magneto-optical recording medium and a high-density recording and reproducing method. The magneto-optical recording medium comprises a first magnetic layer, a second magnetic layer, and a third magnetic layer that are formed successively in a multilayered structure. The first magnetic layer has a coercive force of a domain wall smaller than that of the third magnetic layer, and the second magnetic layer has the Curie temperature lower than those of the first and third magnetic layers. With a high-density recording and reproducing method, the domain wall of the first magnetic layer of the magneto-optical recording medium, which is present at the boundary of a recording mark, is shifted with a temperature gradient, and inversion of magnetization caused by the shift of the domain wall is detected as a polarization change of the reflected light. To stabilize the shift of the domain wall and improve information reproduction, it is desired, in the proposed method, that the domain wall at the front boundary of a recording mark and the domain wall at the rear boundary thereof be independently and separately formed.

In trying to manufacture the proposed medium by forming a recording film on a substrate using a conventional method, however, the formed recording film is substantially uniform in a direction along the film surface, resulting in a difficulty in forming a recording mark that has front and rear walls of a magnetic domain completely separate from each other. Accordingly, the front and rear domain walls have been separated from each other by, for example, annealing both sides of each track with a high-power laser after the formation of the recording film to eliminate or change the magnetic films on both the sides of the track, and forming recording marks in a straddling relation to the annealed areas. However, the necessity of additional annealing has raised a problem in that the process for manufacturing the medium is complicated and the cost is high. It has also been difficult to employ a land/groove recording scheme in which guide grooves formed for servo control on both sides of each information track are also used as information tracks.

SUMMARY OF THE INVENTION

To overcome the problems set forth above, it is an object of the present invention to provide a method of manufacturing an information recording medium, which can form a train of marks of constant width regardless of an information pattern and can also reduce an error rate in reproducing original information even when the information is recorded in a heating mode using a simple recording scheme. Another object of the present invention is to provide a method of manufacturing an information recording medium, which can avoid cross-erase/write even when the intervals between information tracks are decreased.

Still another object of the present invention is to improve the high-density recording and reproducing method proposed in the above-cited Japanese Patent Laid-Open No. 6-290496, for example, in that a characteristic of reproducing information is improved without complicating the method of manufacturing an information recording medium, and that a track density is increased through application of the land/groove recording scheme.

According to the present invention, the above objects are achieved by a method comprising the steps of forming a recording film on a surface of a substrate, including slopes which are positioned on both sides of each information track and have surfaces not parallel to surfaces of the information tracks, and sputter-etching the surface of the substrate by accelerated ions impinging against the surfaces of the information tracks substantially vertically, whereby the recording film on each slope is etched away while the recording film remains on the surface of each information track.

In an information recording medium obtained according to the manufacturing method of the present invention, the recording film is hardly present on the slope between the information tracks. Therefore, even when data is recorded on the information track with possible protrusion onto the slopes on both sides of the information track, the recording is essentially not made on the slopes. As a result, even when recording information by a heating process, the width of the marks formed for recording can be restricted to the information track and a mark train having a predetermined width can be formed regardless of any information pattern.

Most heat produced during the recording or erasing operation is conducted through the recording film and then diffused in a direction along the film surface. In the information recording medium according to the present invention, heat conducted through the recording film is remarkably prevented from further diffusion by the presence of the slope between the information tracks, in which the recording film is hardly present. Therefore, a temperature increase of the tracks adjacent to the information track under heating and cross-erase/write can be prevented.

Further, when the present invention is applied to the recording medium proposed in the above-cited Japanese Patent Laid-Open No. 6-290496, the slopes on both the sides of each information track can be formed to exhibit no magnetism to avoid accumulating the energy of magnetic domain walls. Thus, by forming a heated area for recording in a straddling relation to the recording track and the slopes on both the sides thereof, a recording mark can be formed as a magnetic domain in which no domain walls are present at the sides of the magnetic domain and front and rear domain walls on the recording track are essentially separated from each other.

Further objects, features and advantages of the present invention will become apparent from the following description of the preferred embodiments with reference to the attached drawings.

DESCRIPTION OF THE PREFERRED EMBODIMENTS

Generally, a sputtering rate depends upon an incident angle of ions such that the sputtering rate monotonously increases until the incident angle reaches about 60 degrees relative to the normal of the target surface, reaches a maximum value at the incident angle in the range of 70–80 degrees, and then abruptly decreases when the incident angle increases beyond 80 degrees and becomes 0 at the incident angle of 90 degrees.

Accordingly, when the surface of a substrate, including slopes, which are positioned on both sides of an information track and have inclined surfaces not parallel to the surface of the information track, is subjected to sputter-etching with accelerated ions incident upon the surface of the information track in a substantially vertical direction, the accelerated ions impinge against each slope at an oblique angle, corresponding to the inclination angle of the slope, and the slope is etched at a higher rate than the information track. Thereby, the film on the slopes can be selectively removed while leaving the film only on the information track.

In order to efficiently perform the above-described step with high accuracy, it is preferred for an etching rate ratio between the slope and the information track to be as large as possible.

Assuming that the ratio of an etching rate on the slope and an etching rate on the information track is k and the thickness of a film to be left on the information track after etching is h0, the film thickness h before etching should be $h=h0*k(k-1)$ if both films on the information track and the slope have the same initial thickness (in practice, the films formed on the information track and the slope have different thicknesses from each other and hence the differences in initial thickness of each film are taken into account). Therefore, if the etching ratio is not much greater than 1, the initial film thickness before etching would be so large that the etching step would require a long time and the film could not be etched into a desired shape because the contour of an initially formed film would differ greatly from the surface configuration of the substrate.

Based on the above-described general tendency of the sputtering rate upon the incident angle of ions, the etching rate ratio between the slope and the information track can be maximized by setting the angle of inclination of the slope in the range of about 50 degrees to about 80 degrees relative to the surface of the information track. The extent to which the sputtering rate is changed depending upon the incident angle of ions generally tends to be more noticeable with an increase in weight of the incident ions. Accordingly, the etching rate ratio between the slope and the information track can be increased by using such heavy ions as Ar, Kr and Xe ions.

When a temporary protective film, which is made of a material having a sputtering rate smaller than that of a recording film, is formed on the recording film and then etched, the temporary protective film on the slope is first removed and the recording film is exposed. At this time, the temporary protective film still remains on the surface of the information track so that the recording film on the recording track is protected. As etching continues, an increasing amount of the recording film on the slope is selectively etched due to not only the dependency of the sputtering rate upon the incident angle of ions, but also due to a difference in the sputtering rate between the films themselves. Accordingly, by setting the initial thickness of the temporary protective film such that the temporary protective film remains on the information track when the recording film on the slope has been completely removed, the recording film on the slope can be removed without deteriorating the recording film on the information track, preventing the recording film from being exposed to the irradiated ions, etc.

When the recording film on the slope is etched without forming the temporary protective film, it has such a sectional shape after etching that the recording film on a land is trapezoidal with the film surface side having a greater width than the substrate side in a direction of the track width, and the recording film in a groove is inverse-trapezoidal with the film surface side being wider than the substrate side. This trend is more noticeable as the track width is decreased relative to the thickness of the recording film, resulting in a greater difference in recording and reproducing between the land and the groove. If the land width is decreased even further, the sectional shape of the recording film on the land deforms into a triangle and the recording film remaining on the land cannot have a predetermined thickness. However, when the temporary protective film is formed before etching, it serves to prevent the surface side of the recording film from eroding in the direction of the track width. Therefore, the difference in the sectional shape of the recording film between the land and the groove after etching does not become significant. Further, even with the land width decreased, the sectional shape of the recording film on the land is not deformed into a triangle. Thus, the track density can be increased by decreasing the land width.

Such a temporary protective film is preferably made of a material having a sputtering rate as small as possible. Also, to increase an etching rate ratio between a slope portion and an information track portion of the temporary protective film itself, it is preferable for the material of the temporary protective film to have a sputtering rate that undergoes the greatest possible change depending upon the incident angle of ions. It is generally known that materials made of lighter elements exhibit a greater sputtering rate change. Thus, a material containing, as a primary ingredient, a light-weight element, such as Si, C, Al or B, which has the atomic weight of not more than 30, is suitable to be employed for the temporary protective film because the material will also have a small sputtering rate.

A practical embodiment of the present invention will be described below with reference to the drawings.

Figure 1:
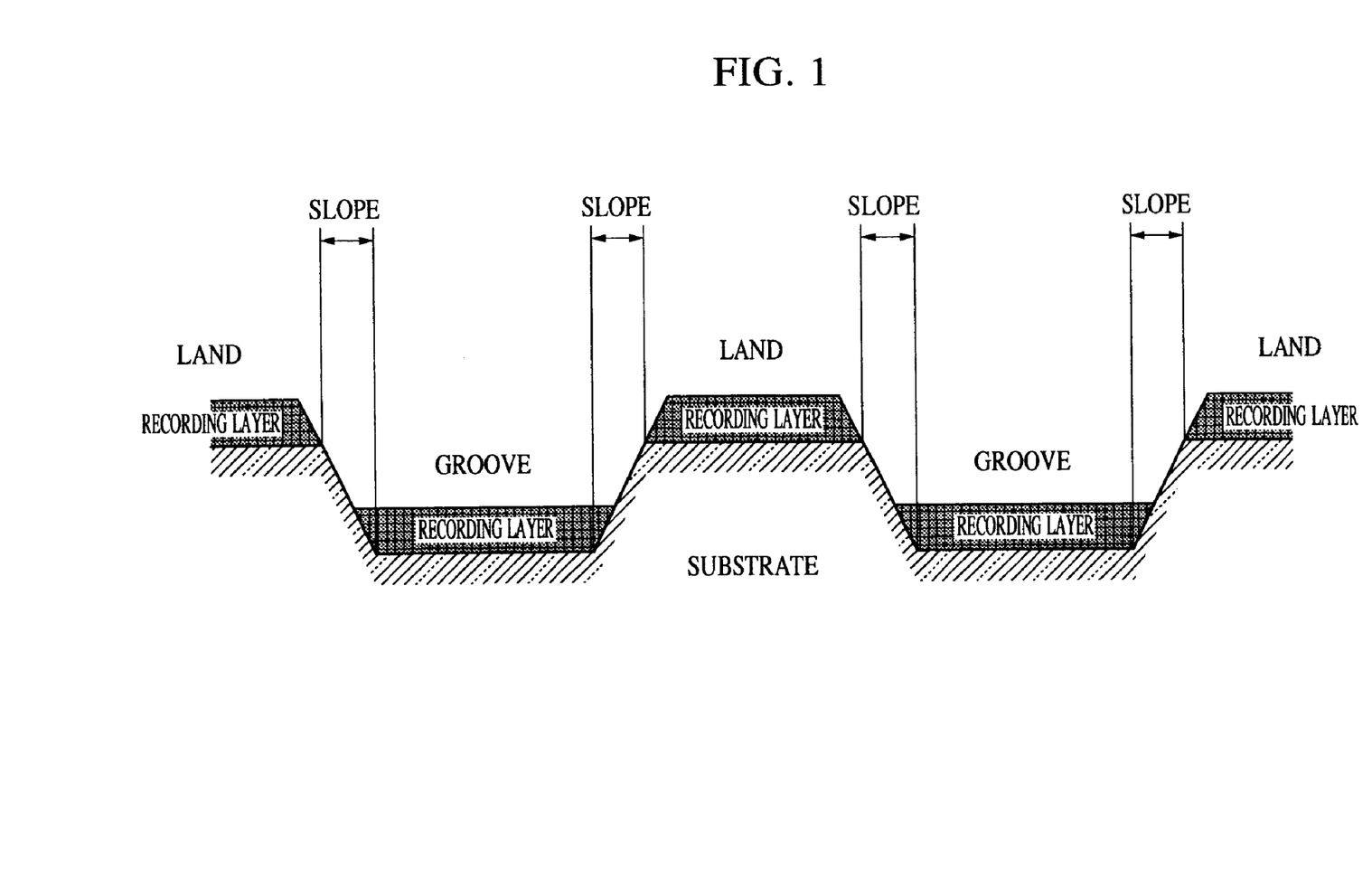
FIG. 1 is a schematic sectional view of an information recording medium according to one embodiment of the present invention.

FIG. 1 is a schematic sectional view of an information recording medium according to one embodiment of the present invention. A substrate is in the form of a circular disk, for example, and grooves are formed on the substrate surface in a spiral or concentric pattern. Lands having flat surfaces parallel to the substrate surface are each present between the adjacent grooves. The lands and/or the grooves are used as information tracks. Each of the information tracks has slopes positioned on both sides, which are not parallel to the substrate surface. A recording layer (film) made of a magneto-optical recording material or a phase-change recording material, for example, is formed on the substrate surface. A protective layer, a reflecting layer, a heat radiating layer, etc. made of a dielectric material or a metallic material, for example, may be formed in a laminated structure above or below the recording layer. Those layers can be formed, for example, by a successive sputtering process using a magnetron sputtering apparatus, or a successive vapor deposition process.

EXAMPLE 1

A substrate having grooves with a pitch of 1.2 μm and a depth of 160 nm was fabricated. A flat portion with a flat surface of about 0.5 μm wide and parallel to the substrate surface was formed on each land between the grooves and a bottom portion of the groove. A slope between the land and the groove had an angle of inclination of about 60 degrees relative to the substrate surface. On the substrate thus fabricated, a recording layer was formed by a sputtering process described later. The recording layer in this example was made of a magneto-optical recording material.

The magneto-optical recording material can be selected from various kinds of materials, but may be, e.g., a rare earth-iron-group element amorphous alloy made up of 10–50 at % of one or more kinds of rare earth metal elements such as Pr, Nd, Sm, Gd, Tb, Dy and Ho, and 50–90 at % of one or more kinds of iron-group elements such as Fe, Co and Ni. Any other suitable element, such as Cr, Mo, Cu, Ti, Al, Si, Pt and In, may be added in a small amount to improve corrosion resistance.

Saturation magnetization of the rare earth-iron-group element amorphous alloy can be controlled depending upon a composition ratio of the rare earth element and the iron-group element.

A coercive force can be controlled by adjusting the saturation magnetization, but it is essentially controlled by adjusting vertical magnetic anisotropy through selection of the material. In general, materials based on Tb, Dy, etc. have large values for both the vertical magnetic anisotropy and the coercive force, whereas the values for a Gd-based material are small. Also, vertical magnetic anisotropy is reduced by addition of a nonmagnetic element.

The Curie temperature can also be controlled by adjusting the composition ratio. However, to control the Curie temperature independently of the saturation magnetization, it is more preferable to use, as the iron group, a material in which a part of Fe is replaced with Co, and to control the amount of Fe replaced. More specifically, an increase of the Curie temperature on the order of about 6° is expected by replacing 1 at % of Fe with Co. Based on that relationship, the amount of added Co is adjusted so that the desired Curie temperature is obtained. Conversely, the Curie temperature can be lowered by adding a minute amount of a nonmagnetic material, such as Cr or Ti. As an alternative, the Curie temperature may be controlled by using two or more kinds of rare earth elements and adjusting a composition ratio of the rare earth elements used.

A practical process for forming the recording layer in this example is as follows.

A B-doped Si target, a target of a Tb 0.22 (FeCo 0.05) alloy, and an Al target were placed in a DC magnetron sputtering chamber. The substrate fabricated as described above was fixed to a substrate holder and arranged so that the substrate surface is opposite to the surface of each target. Then, the chamber was evacuated by a cryopump until reaching a high vacuum of $1\times10^{-5}$ Pa or below. Ar gas was introduced to the chamber while continuing the vacuum evacuation, and an electric power was supplied to the targets successively for sputtering while the substrate was rotated. A SiN layer with a thickness of 80 nm was formed as an underlying film on the substrate. Thus, a TbFeCo layer was formed as a recording film in a thickness of 40 nm, twice that to be finally left.

During the step of forming the SiN layer, $N_2$ gas introduced in addition to the Ar gas and the SiN layer was formed by DC reactive sputtering. Also, in the step of forming the TbFeCo layer, the pressure of the Ar gas was set to 0.8 Pa and the power supplied to the target was set to 500 W.

Next, while maintaining a vacuum, the substrate, after the above-described film forming process, was transferred to a sputter-etching chamber including an accelerated ion irradiating source. In the sputter-etching chamber, an accelerated Ar ion beam irradiated the substrate surface in a vertical direction for sputter- etching of the film formed on the substrate. Since the minute groove pattern was formed on the substrate surface as described above, the slope between the land and the groove was inclined at about 60 degrees relative to the substrate surface. Accordingly, the ions impinged against the film surface at an incident angle of about 60 degrees on the slope.

Due to the dependency of the sputtering rate upon the incident angle of the ions, the film on the slope was etched by sputtering at a higher rate than the films on the land surface and the groove surface. The etching was continued until the thickness of the recording films on the land surface and the groove surface was reduced to a predetermined thickness of 20 nm. As a result, the recording film on the slope was completely removed and the underlying film was exposed.

Subsequent to the above-described step, the substrate was transferred back to the DC magnetron sputtering chamber in which, in succession, a 20 nm thick SiN layer was formed as an overlying film and a 50 nm Al layer was formed as a reflecting and heat-radiating film on the substrate.

After taking a thus-manufactured disk out of the vacuum chamber, an UV resin was coated on the film surface.

Comparative Example 1

As a comparative example, a sample disk was fabricated in the same manner as in Example 1 except that, after forming a TbFeCo layer at the predetermined thickness of 20 nm, a SiN layer, serving as an overlying film, and an Al layer were formed in succession without etching the TbFeCo layer.

For the sample disks fabricated according to Example 1 of the present invention and Comparative Example 1, recording and reproducing characteristics were measured by setting each sample disk in a drive unit provided with an optical head that had a laser wavelength of 680 nm and included an object lens of NA 0.55, rotating the disk at a constant cycle of 50 Hz, and measuring the characteristic at a position of the disk radius of 30 mm.

The recording bias magnetic field was set to 300 Oe and (1–7) RLL random data was written by the mark-edge recording while the recording power was changed. The laser driving waveform was set such that the rising of an input signal was delayed 1T and a laser pulse with a width of (n−1)T was irradiated corresponding to the input signal with a width of nT. The clock frequency was set to 25 MHz and the shortest mark length was set to 0.75 $\mu$m.

The thus-recorded random data was reproduced with a reproducing power of 1.5 mW, and a resulting analog signal waveform was sliced depending upon a DC level for binary coding to measure the intervals between rising edges of the reproduced signal. Then, a relative jitter distribution was derived for $10^5$ samples extracted from the entire data pattern, and the dependency of a jitter margin upon the recording power was compared for each sample disk.

Figure 2:
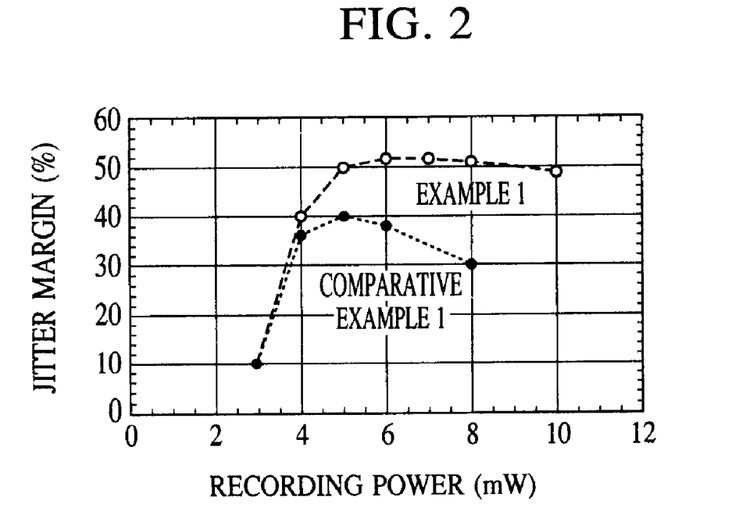
FIG. 2 is a graph showing the dependency of a jitter margin upon a recording power.

Results of the measurement are shown in FIG. 2. A sufficiently large jitter margin was obtained over a wide range of the recording power in the sample disk of Example 1. In the sample disk of Comparative Example 1, however, the dependency of the jitter margin upon the recording power was significant and a sufficiently large jitter margin was not obtained even with the optimum recording power.

Figure 3:
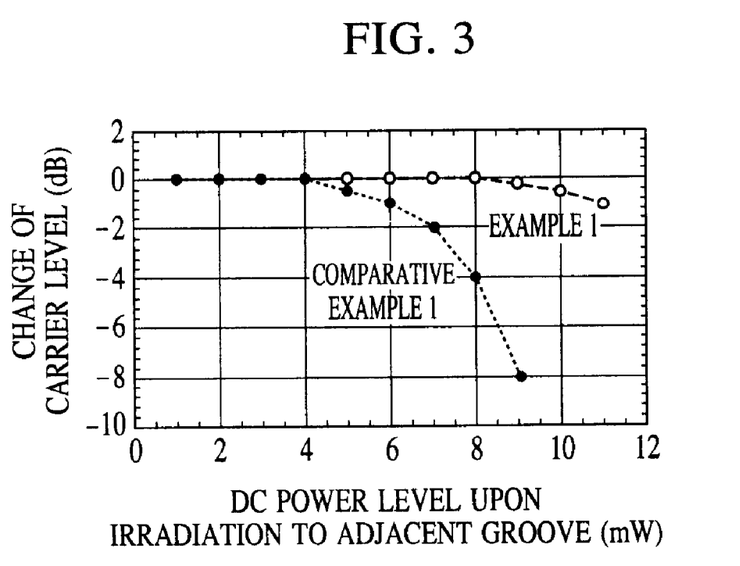
FIG. 3 is a graph showing the dependency of changes of a carrier level on a land upon a DC laser power irradiating an adjacent groove.

Subsequently, the effect on cross-erase/write was examined. First, a repeated pattern with a mark length of 0.75 $\mu$m was recorded on the land and an initial carrier level was measured. A DC laser beam irradiated an adjacent groove through tracking servo control. After the irradiation, a tracking target was returned to the land and a carrier level was measured again. FIG. 3 shows the dependency of changes of the carrier level from the initial level upon the DC laser power irradiating the adjacent groove. It is found that the sample disk of Example 1 has cross-erase/write resistance greatly improved in comparison with the sample disk of Comparative Example 1.

EXAMPLE 2

A recording film was formed on the same substrate as used in Example 1 by the film forming process described below.

Targets of B-doped Si, Gd, Tb, Fe, Co, Cr and Al were placed in a DC magnetron sputtering chamber. The substrate fabricated as described in Example 1 was fixed to a substrate holder, and then the chamber was evacuated by a cryopump until reaching a high vacuum of $1\times10^{-5}$ Pa or below.

Ar gas was introduced to the chamber while continuing an evacuation to a vacuum, and an electric power was supplied to the targets for sputtering to form a 90 nm SiN layer, a 30 nm GdFeCr layer, serving as a first magnetic layer, a 10 nm TbFeCr layer, serving as a second magnetic layer, and a 80 nm TbFeCoCr layer, serving as a third magnetic layer in succession while the substrate was rotated.

In forming each of the magnetic layers, a distribution of electric powers supplied to the targets was adjusted such that the composition ratio of a rare earth element to an iron-group element was set to make the rare earth element slightly richer in the vicinity of the compensated composition for each magnetic layer. The Curie temperature was set to 210° C. for the first magnetic layer, 160° C. for the second magnetic layer, and 290° C. for the third magnetic layer by adjusting the amounts of Co and Cr added. At temperatures in the vicinity of the ambient temperature, the coercive force of a domain wall of the first magnetic layer was not more than 100 Oe, and the coercive force of a domain wall of the third magnetic layer was not less than 20 kOe.

This sample was a disk satisfying the conditions of the recording medium proposed in the above-cited Japanese Patent Laid-Open No. 6-290496. More specifically, the first magnetic layer is formed of a magnetic film having a coercive force of a domain wall smaller than that of the third magnetic layer, near the ambient temperature, and the second magnetic layer is formed of a magnetic film having the Curie temperature lower than those of the first and third magnetic layers. Third magnetic layer is formed of a vertically magnetized film. The Curie temperature of the first magnetic layer may be given a gradient in a direction of the film thickness such that the Curie temperature is lowered toward the second magnetic layer. Also, for the purpose of adjusting a transfer property, a magnetic layer having a higher energy density of a domain wall than the first magnetic layer and the Curie temperature higher than the second magnetic layer may be interposed between the first magnetic layer and the second magnetic layer.

After forming the above-described magnetic layers, a 50 nm Si layer was formed as a temporary protective film.

The above-mentioned value of each film thickness represents a thickness of the films formed on the flat portions of the land and the groove of the substrate. The film was formed on the land with a thickness of about 80% of that on the flat portion.

Subsequently, 100 W of electric power were supplied to the substrate side for reverse sputtering to etch the temporary protective film and the recording film. In this step, the pressure of Ar gas was set to 0.8 Pa.

The behavior of ions impinging against the substrate during the reverse sputtering is very complicated because it depends upon changes in an electric field due to surface conditions of the substrate and the mean free path of the ions. In terms of probability, however, the ions impinge against an electrode vertically, i.e., against the substrate surface in a vertical direction, with the highest probability. This means that, in the slope inclined at about 60 degrees between the land and the groove, the ions impinged against the film surface at an incident angle of about 60 degrees with a maximum proportion.

Due to the dependency of the sputtering rate upon the incident angle of the ions, the film on the slope is etched by sputtering at a higher rate than the films on the land surface and the groove surface.

In this Example 2, the etching rate of the Si film was about 0.4 nm/min on both the land and groove surfaces, and about 1.0 nm/min on the slope. Also, the etching rate of the magnetic film was about 0.8 nm/min on both the land and groove surfaces, and about 1.2 nm/min on the slope.

After 40 minutes from the start of the etching, the Si film on the slope was completely removed and the magnetic film was exposed, whereas the Si film on each of the land and groove surfaces remained about 34 nm at the same time point. By further continuing the etching for 80 minutes, the recording film on the slope was completely removed and the underlying film was exposed. On each of the land and groove surfaces, the Si film was substantially removed, but the recording film was remained in the same thickness as initially formed.

Subsequent to the above-described step, a SiN layer with a thickness of 50 nm was formed as an overlying film and an Al layer with a thickness of 20 nm was finally formed as a heat radiating film on the substrate in succession.

After taking a thus-manufactured disk out of the vacuum chamber, an UV resin was coated on the film surface.

Comparative Example 2

A sample disk was fabricated in the same manner as in Example 2 except that, after forming the magnetic layers, an overlying film of 50 nm and a heat radiating film of 20 nm were formed in succession without the temporary protective film or reverse sputtering for etching.

For the sample disks fabricated according to Example 2 of the present invention and Comparative Example 2, recording and reproducing characteristics were measured by setting each sample disk in a drive unit provided with an optical head that had a laser wavelength of 680 nm and included an object lens of NA 0.55, rotating the disk at a constant cycle of 7.5 Hz,,and measuring the characteristics at a position of the disk radius of 31.8 mm.

A repeated pattern with a mark length of 0.1 $\mu$m was recorded under magnetic modulation by irradiating a DC laser beam for recording while modulating a magnetic field at 7.5 Hz with a sliding magnetic head.

Figure 4:
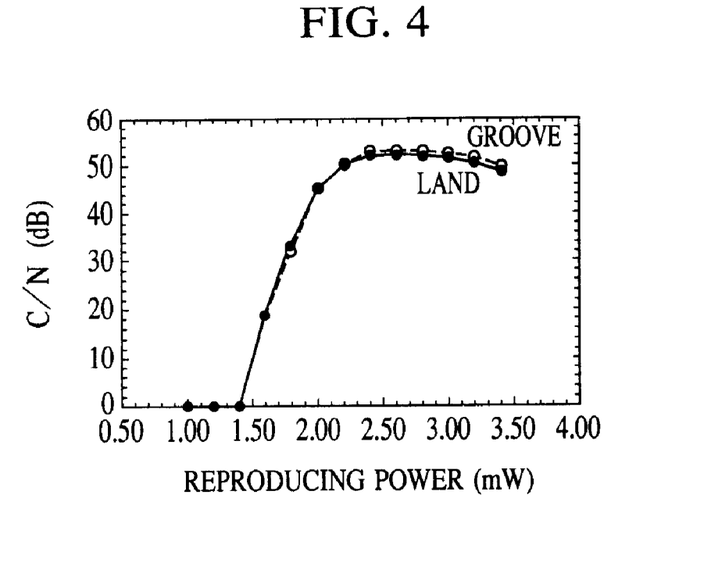
FIG. 4 is a graph showing the dependency of a C/N ratio upon a reproducing power.

A signal having such a pattern was recorded with a recording power of 4.5 mW, and the dependency of C/N (carrier/noise ratio) upon a reproducing power was measured. Results of the measurement are shown in FIG. 4 for the sample disk of Example 2 and in FIG. 5 for the sample disk of Comparative Example 2. An ordinary one-beam optical system was used for evaluation in the measurement, and a temperature gradient for shifting a domain wall was formed by heating with a reproducing beam itself.

Figure 5:
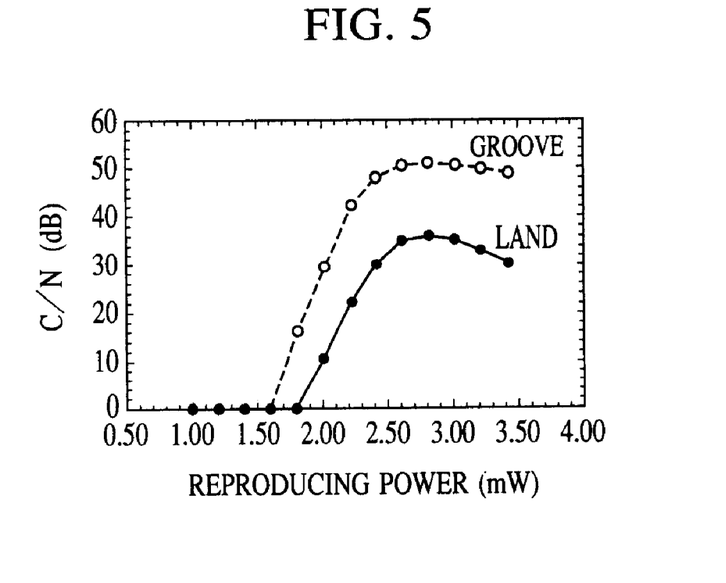
FIG. 5 is a graph showing the dependency of a C/N ratio upon a reproducing power.

As seen from FIGS. 4 and 5, the sample disk of Example 2 showed almost the same good characteristic for both the land and the groove. In the sample disk of Comparative Example 2, however, the characteristics are much different between the land and the groove, and even the relatively better characteristics for the groove are not as good as those of the sample disk of Example 2.

In the sample disk of Example 2, by irradiating at a recording power not smaller than a predetermined value, so as to form a heated area for recording in a straddling relationship to a recording track and slopes on both sides thereof, a recording mark can be formed as a magnetic domain in which no domain walls are present at the sides and front and rear magnetic walls on the recording track are essentially separated from each other. Therefore, the domain wall on the recording track can be shifted with stability in a direction of the track under a temperature gradient.

On the other hand, in the sample disk of Comparative Example 2, even when a heated area for recording is formed in a straddling relationship to a recording track and slopes on both sides thereof, domain walls are formed in the slopes and the formed domain walls are present at the sides of a magnetic domain. Thus, a recording mark is formed as a magnetic domain in which front and rear domain walls on the recording track are interconnected and closed through the domain walls present at the sides of the magnetic domain. Accordingly, in trying to shift the domain wall on the recording track in a direction of the track under a temperature gradient, the mobility of the domain wall is changed depending whether the shift of the domain wall is in a direction of expansion of the magnetic domain or in a direction of shrinkage thereof. For this reason, the domain wall cannot be shifted with stability and large noises are caused.

The above-described advantage results from the reproduction of the first magnetic layer. In addition, the present invention can provide another advantage of improving preservation of a minute magnetic domain, as described below, by separating front and rear domain walls of the third magnetic layer on the recording track.

A repeated pattern with a mark length of 0.1 $\mu$m to 0.05 $\mu$m was recorded on each of the sample disks under magnetic modulation while changing the modulation frequency. As a result, in the sample disk of Example 2, the recording pattern was confirmed until the mark length of 0.05 $\mu$m. In the sample disk of comparative Example 2, the recording pattern could barely be confirmed at the mark length of not larger than 0.08 $\mu$m because of shrinkage of the magnetic domain.

Further, as with the sample disks of Example 1 and Comparative Example 1, it was found that the sample disk of Example 2 was noticeably superior in the jitter margin, the recording power margin obtained at a predetermined jitter margin, and cross-erase/write resistance to the sample disk of Comparative Example 2.

Comparative Example 3

As a comparative example for verifying the advantage resulting from forming a Si film for temporary protection before etching, a sample disk was fabricated in the same manner as in Example 2, except that, after forming the magnetic layers, the substrate was subjected to reverse-sputter etching without forming the temporary protective film until the magnetic layers on the slope were removed.

In this Comparative Example 3, an initial thickness of the third magnetic layer was adjusted, as described below, so that each magnetic layer after etching had the same film thickness as in Example 2.

The etching rate of the magnetic film was about 0.8 nm/min on both the land and groove surfaces, and about 1.2 nm/min on the slope. Also, the magnetic film was formed on the land with a thickness of about 80% of that on the flat portions of the land and the groove. In view of the above, the third magnetic layer was formed in a thickness of 220 nm so that an initial total thickness of the magnetic layers was 260 nm.

By so setting the film thickness, the magnetic films on the slope were totally removed in 175 minutes as represented by 260 nm*0.8–1.2 nm/min*175 min=~0 nm. On the flat portions of the land and the groove, the first magnetic layer of 30 nm and the second magnetic layer of 10 nm remained the same as initially formed, whereas the third magnetic layer remained after being etched to a thickness of about 80 nm.

Figure 6:
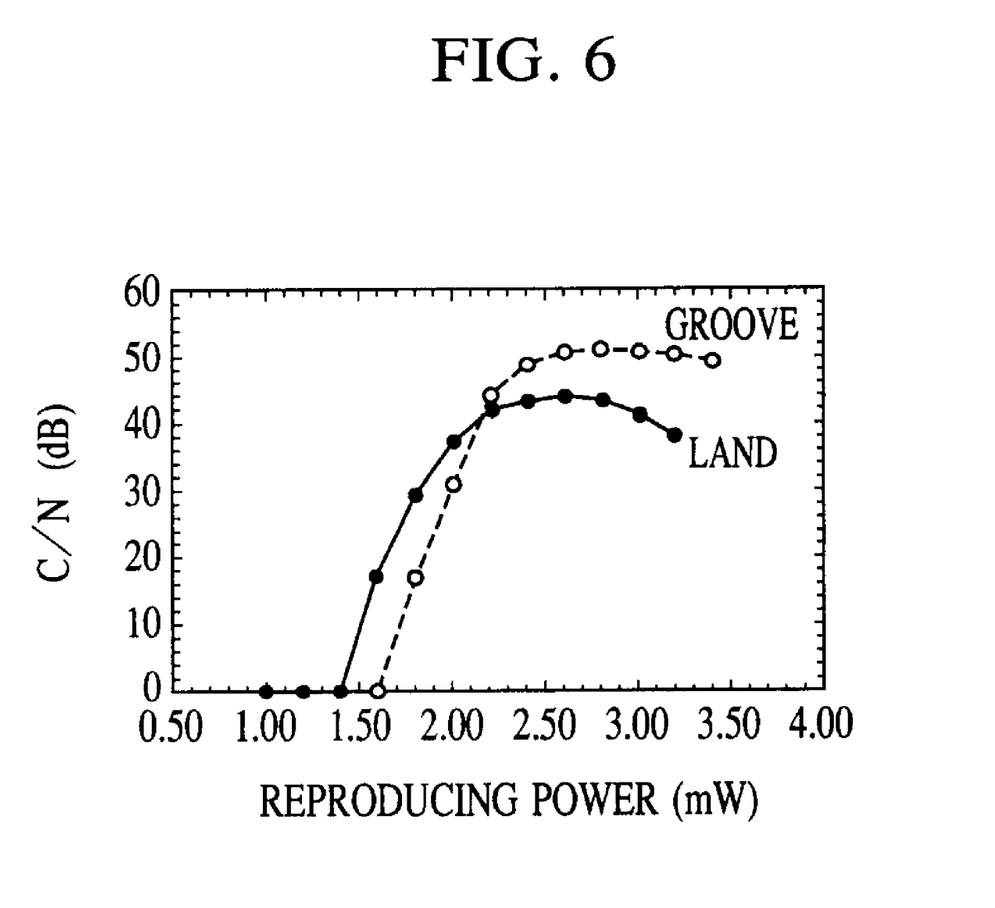
FIG. 6 is a graph showing the dependency of a C/N ratio upon a reproducing power.

A dynamic of the sample disk of Comparative Example 3 was measured in the same manner as described above. FIG. 6 shows the results of the measurement. The dynamic is different between the land and the groove. Particularly, it is not as good for the land as for the sample disk of Example 2, wherein the magnetic film was etched after forming the temporary protective film. It is understood that, by forming, as the temporary protective film, a film with a smaller sputtering rate than the recording film and greater dependency of the sputtering rate upon the incident angle of ions than the recording film, the film condition after etching is improved for the reasons described above, whereby a better dynamic is obtained and a difference between the land and the groove is eliminated.

Furthermore, the time required for the etching step in Example 2, including the formation of the temporary protective film, is cut down to about ⅔ of that required in Comparative Example 3. Hence, it is understood that the temporary protective film is also effective in improving the efficiency of the manufacturing process.

EXAMPLE 3

A sample disk was fabricated in the same manner as in Example 2, except that, after forming the magnetic layers, a SiN layer of 10 nm was formed as a heat buffer film and an Al layer was then formed as not only a temporary protective film but also a heat radiating film. Then, the substrate was subjected to reverse-sputter etching such that the Al layer was not only a temporary protective film but was also a heat radiating film etched to a thickness of 20 nm on the flat portions of the land and the groove, whereas the temporary protective film also serving as the heat radiating film, the heat buffer film, and the magnetic layers were removed from the slope.

As with the Si film, the Al film also has a smaller etching rate than the magnetic film. Therefore, the film condition after the etching was improved, comparable characteristics were obtained for both the land and the groove, and a dynamic was improved.

In the sample disk of this Example 3, since the Al film serving as the heat radiating film was disconnected between the land and the groove, thermal interference between both tracks in the land and the groove was prevented and the cross-erase/write resistance was further improved.

Additionally, in the sample disk of this Example 3, since ends of the magnetic films are in direct contact with the overlaid UV resin in the slope, there is a possibility that corrosion of the magnetic films may progress from the contact ends. To avoid the corrosion of the magnetic films, a protective film of SiN, for example, may be coated over the substrate after the end of the etching process.

EXAMPLE 4

A substrate having a slope inclined at an angle of 70 degrees between a land and a groove was employed. An underlying film and magnetic films were formed in the same manner as in Example 2, and a 20 nm carbon film was then formed as a temporary protective film.

Next, while maintaining a vacuum, the substrate having finished the above-described film forming process was transferred to a sputter-etching chamber, including an accelerated ion irradiating source. In the sputter-etching chamber, an accelerated Xe ion beam was irradiated on the substrate surface in a vertical direction for sputter-etching of the films formed on the substrate.

The sputter etching continued until the temporary protective film and the magnetic films on the slope were completely removed. At the end of etching, the carbon film of about 2 nm and the underlying magnetic films remained on the land surface and the groove surface.

Subsequently, a 50 nm thick SiN layer was formed as a protective film on the substrate having finished the above-described etching process in the same chamber by ion beam sputtering with a SiN target.

After taking a thus-manufactured disk out of the vacuum chamber, an UV resin was coated on the film surface.

As compared with the sample disk of Example 2, in the sample disk of this Example 3, since the incident angle of ions is set to a value at which a higher sputtering rate is obtained and accelerated ions from the accelerated ion irradiating source are irradiated at the substrate in a high vacuum, a disorder in the incident ions is more effectively prevented. In addition, since Xe ions, which are heavier than Ar ions, are used as the etching gas and the temporary protective film is formed as a film of carbon, which is lighter than Si, the sputtering rate of the film on the slope is increased to a value higher than that on the flat portions of the land and the groove, and the film on the slope is etched more selectively.

Further, the carbon film employed as the temporary protective film has an etching rate much smaller than that of the magnetic film. Therefore, after the temporary protective film on the slope has been etched away to make the magnetic film exposed, all of the magnetic films on the slope are removed by the continued etching while the temporary protective film on the land is hardly etched in a direction of the track width.

For those reasons, the film condition after the etching can be further improved in the sample disk of this Example 4.

As fully described above, according to the present invention, a desired recording mark can be formed without needing any recording compensation, etc. by complicated laser driving, and good reproducing can be obtained. In the case of writing data by the mark-edge recording, particularly, a jitter of a detected edge signal is suppressed and an operation margin is increased. Further, thermal interference between adjacent tracks during the operation is suppressed. As a result, higher density recording can be achieved and the cost of the medium and the recording device can be reduced.

Also, by combining the present invention with the magneto-optical recording medium proposed in the above-cited Japanese Patent Laid-Open No. 6-290496, a magnetic domain wall at the front boundary of a recording mark and a magnetic domain wall at the rear boundary thereof can be independently formed and separated, and ultra-high density reproducing can be improved without increasing the cost.

Further, according to the present invention, the preservation of a minute magnetic domain can be improved and the ultra-high density reproducing can be achieved.

Moreover, when the land and the groove are both used as information tracks, a difference in the recording and reproducing between the land and the groove can be prevented.

Additionally, the land width can be decreased and the track density can be increased.

It is to be noted that the present invention is not limited to the medium having the structure described above. in particular, the above-first-mentioned advantage can be obtained by applying the present invention to any type of medium in which data is recorded in a heating mode, such as a phase-change recording medium and a write-once recording medium.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of manufacturing an information recording medium, comprising the steps of:

forming a recording film on a surface of a substrate, including slopes, which are positioned on both sides of each information track and have surfaces not parallel to surfaces of said information tracks; and sputter-etching the surface of said substrate by accelerated ions impinging against the surfaces of said information tracks in a substantially vertical direction, thereby etching away the recording film on each said slope.

2. The method of manufacturing an information recording medium according to claim 1, further comprising a step of forming a temporary protective film made of a material having a sputtering rate smaller than that of said recording film, after the step of forming said recording, film.

3. The method of manufacturing an information recording medium according to claim 1, further comprising a step of forming a temporary protective film made of a material with greater dependency of a sputtering rate upon an incident angle of the ions than said recording film, after the step of forming said recording film.

4. The method of manufacturing an information recording medium according to claim 2 or 3, wherein said temporary protective film is made of material comprising an element having an atomic weight of not more than 30.

5. The method of manufacturing an information recording medium according to claim 1, wherein the accelerated ions used in said sputter-etching are Ar or heavier ions.

6. The method of manufacturing an information recording medium according to claim 1, wherein an angle of inclination of each said slope is in a range of 50 degrees to 80 degrees relative to the surfaces of said information tracks.

* * * * *

UNITED STATES PATENT AND TRADEMARK OFFICE
CERTIFICATE OF CORRECTION

PATENT NO. : 6,554,974 B2
DATED : April 29, 2003
INVENTOR(S) : Tsutomo Shiratori It is certified that error appears in the above-identified patent and that said Letters Patent is hereby corrected as shown below:

<u>Title page,</u>
After "* cited by examiner", insert Item -- [74] *Attorney, Agent or Firm* – Fitzpatrick, Cella, Harper & Scinto --.

<u>Column 14,</u>
Line 11, "recording," should read -- recording --.

Signed and Sealed this

Twenty-seventh Day of January, 2004

JON W. DUDAS
*Acting Director of the United States Patent and Trademark Office*